US010572885B1

(12) United States Patent
Guo et al.

(10) Patent No.: US 10,572,885 B1
(45) Date of Patent: Feb. 25, 2020

(54) TRAINING METHOD, APPARATUS FOR LOAN FRAUD DETECTION MODEL AND COMPUTER DEVICE

(71) Applicant: BEIJING TRUSFORT TECHNOLOGY CO., LTD., Haidian, Beijing (CN)

(72) Inventors: Hao Guo, Beijing (CN); Shanping Sun, Beijing (CN); Yumeng Chen, Beijing (CN); Zhun Cai, Beijing (CN); Yue Sun, Beijing (CN); Xiaopeng Guo, Beijing (CN)

(73) Assignee: BEIJING TRUSFORT TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/374,196

(22) Filed: Apr. 3, 2019

(30) Foreign Application Priority Data

Oct. 25, 2018 (CN) .......................... 2018 1 1249964

(51) Int. Cl.
*G06Q 30/00* (2012.01)
*G06Q 40/02* (2012.01)
*G06N 3/04* (2006.01)
*G06N 3/08* (2006.01)

(52) U.S. Cl.
CPC ........... *G06Q 30/0185* (2013.01); *G06N 3/04* (2013.01); *G06N 3/08* (2013.01); *G06Q 40/025* (2013.01)

(58) Field of Classification Search
CPC .... G06Q 30/0185; G06Q 40/025; G06N 3/04; G06N 3/08
See application file for complete search history.

(56) References Cited

U.S. PATENT DOCUMENTS

2017/0213280 A1\* 7/2017 Kaznady ................ G06Q 40/02

\* cited by examiner

*Primary Examiner* — Li B. Zhen
*Assistant Examiner* — Scott R Gardner
(74) *Attorney, Agent, or Firm* — DLA Piper LLP US

(57) ABSTRACT

Training method and apparatus for loan fraud detection model and a computer device are provided, wherein the training method for loan fraud detection model includes: acquiring identity information and user's bank statement information of a plurality of sample users, and fraud label information corresponding to each user; constructing an identity feature vector and a behavior pattern vector according to the identity information; constructing a statement feature vector according to the behavior pattern vector, a second vector transformation matrix and the user's bank statement information; generating a target feature vector according to the behavior pattern vector and the statement feature vector; feeding a target neural network with the target feature vector to acquire a fraud detection result of the target feature vector; and training the target neural network, the first vector transformation matrix and the second vector transformation matrix to obtain a loan fraud detection model.

18 Claims, 12 Drawing Sheets

TRAINING METHOD, APPARATUS FOR LOAN FRAUD DETECTION MODEL AND COMPUTER DEVICE

CROSS-REFERENCE TO RELATED APPLICATIONS

The present disclosure claims priority to Chinese Patent Application No. 2018112499644, filed Oct. 25, 2018 and entitled "Training method for loan fraud detection model, Loan Fraud Detecting Method and Apparatus". The contents of which is incorporated herein by reference in its entirety.

TECHNICAL FIELD

The present disclosure relates to the technical field of information processing, and particularly to a training method for loan fraud detection model, a training apparatus for loan fraud detection model and a computer device.

BACKGROUND ART

With the rapid development of Internet finance, there is a rise in Internet fraud and in the incidence of credit risks. According to statistics, in recent years, the rate of bad assets in China's consumer finance industry has been on a continuous rise, the risk of Internet fraud in China has ranked third in the world, and cybercrime is causing to the world an economic loss as much as $445 billion per year, which is increasingly complex and is permeating into different industries.

Internet financial risks include credit risks and operation risks. The credit risks mean that a customer has no intention to repay a loan when he raises the loan demand. Among the credit risks, the category of fraud risks is predominant, and more than 50% of bad debt loss in consumer finance results from frauds.

In order to avoid fraudulent conducts in loaning, at present, the lending platforms substantially all adopt the way of manual checking (verification, reviewing) when handling a user's loan request, and check the materials that the user is required to provide in order to prove his identity information when raising a loan request, these materials being capable of reflecting personal information and generally including: schooling certificate, income certificate, career information, information of domicile place, historical bank statement information, etc.

Generally speaking, the lending platforms will only make loans to the borrowers who are deemed to have repayment ability and have normal consumption behaviors, and the bank statement information is the most important dimension to measure the repayment ability of a user. Having a fixed monthly income and a record of regular consumer behaviors will endow a user with a high probability of going through the checking of the lending platforms. On the basis of such lending rules, many illegal intermediaries now help the borrowers conceal their credentials by falsifying bank statements in order to get loans. Such borrowers are often at high risk of being overdue or even losing contact.

At the time of performing credit checking on the borrowers on the credit platforms, judgment is substantially made based on the expert experience of the business personnel. Since the historical statement information of bank is often complicated and involves a relatively large volume of information, pure manual checking will not only lead to a low efficiency, but also make it very difficult to make an overall correct conclusion by integrating bank statement data and user's personal information.

SUMMARY

In view of the above, the object of the present disclosure includes providing a training method for loan fraud detection model, a training apparatus for loan fraud detection model and a computer device.

In a first aspect, a training method for loan fraud detection model is provided, the method comprising steps of:

acquiring identity information and user's bank statement information of a plurality of sample users, and fraud label information corresponding to each user;

constructing, for each of the sample users, an identity feature vector according to the identity information of the sample user, and non-linearly transforming the identity feature vector using a first vector transformation matrix to obtain a behavior pattern vector of the sample user;

constructing a statement feature vector of the sample user according to the behavior pattern vector of the sample user, a second vector transformation matrix and the user's bank statement information;

concatenating the behavior pattern vector of the sample user with the statement feature vector of the sample user to generate a target feature vector of the sample user, wherein the target feature vector is configured to represent a behavior pattern and an income and expenditure condition of the user;

feeding a target neural network with the target feature vector of each of the sample users, and acquiring a fraud detection result of the target feature vector of each of the sample users; and training the target neural network, the first vector transformation matrix and the second vector transformation matrix according to the fraud detection result of each of the sample users and corresponding fraud label information to obtain a loan fraud detection model.

In a second aspect, a training apparatus for loan fraud detection model is provided, the apparatus comprising:

a first acquiring module configured to acquire identity information and user's bank statement information of a plurality of sample users, and fraud label information corresponding to each user;

a first constructing module configured to construct, for each of the sample users, an identity feature vector according to the identity information of the sample user, and non-linearly transform the identity feature vector using a first vector transformation matrix to obtain a behavior pattern vector of the sample user;

a second constructing module configured to construct a statement feature vector of the sample user according to the behavior pattern vector of the sample user, a second vector transformation matrix and the user's bank statement information;

a vector concatenating module configured to concatenate the behavior pattern vector of the sample user with the statement feature vector of the sample user to generate a target feature vector of the sample user, wherein the target feature vector is configured to represent a behavior pattern and an income and expenditure condition of the user; and a training module configured to feed a target neural network with the target feature vector of the sample user to acquire a fraud detection result of the target feature vector of the sample user; and train the target neural network, the first vector transformation matrix and the second vector transformation matrix according to the fraud detection result of the sample user and corresponding fraud label information to obtain a loan fraud detection model.

In a third aspect, an embodiment of the present disclosure provides a computer device, comprising a memory and a processor, wherein the memory is configured to store a computer program, and the processor is configure to implement, when executing the computer program, the training method for loan fraud detection model described in the above described first aspect.

In order to make it more apparent and easier to understand the above described objects, features and advantages of the present disclosure, detailed description is made below in connection with preferred embodiments with reference to the accompanying drawings.

BRIEF DESCRIPTION OF DRAWINGS

In order to more clearly illustrate the technical solutions of the embodiments of the present disclosure, brief description is made below on the drawings required to be used in the embodiments. It should be understood that the following drawings only illustrate some of the embodiments of the present disclosure and shall not be construed as a limitation on the scope, and for a person of ordinary skills in the art, other related drawings may be obtained from these drawings without inventive effort.

Figure 1:
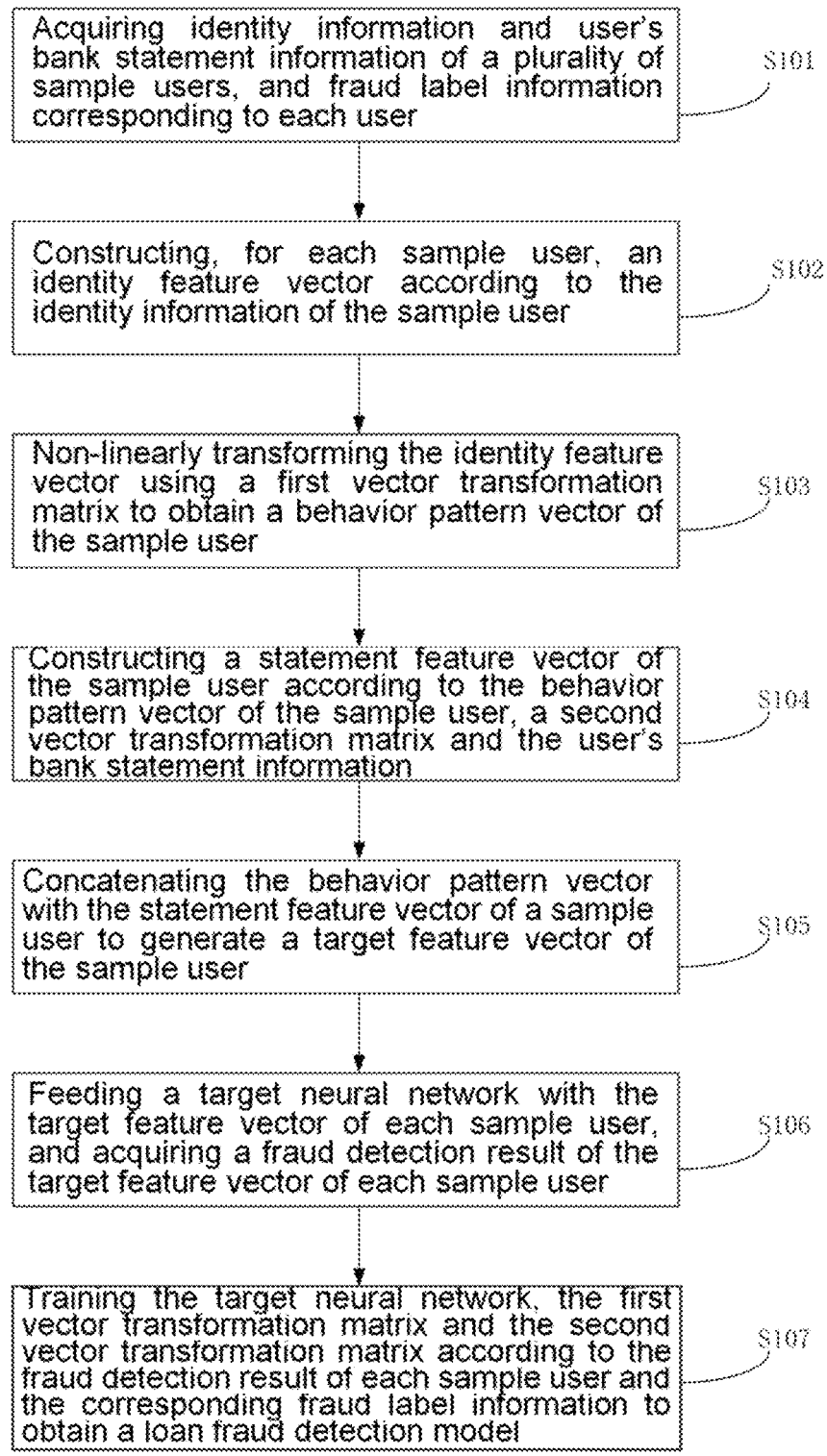
FIG. 1 is a flowchart of a training method for loan fraud detection model provided in an embodiment of the present disclosure.

Reference signs: 700—training apparatus for loan fraud detection model; 701—first acquiring module; 702—first constructing module; 703—second constructing module; 704—vector concatenating module; 705—training module; 800—loan fraud detecting apparatus; 801—second acquiring module; 802—third constructing module; 803—fourth constructing module; 804—concatenating module; 805—detecting module; 900—computer device; 91—processor; 92—memory; 921—internal memory; 922—external memory; and 93—bus.

DETAILED DESCRIPTION OF EMBODIMENTS

At present, in the credit industry, it is a general practice to manually check whether an initiator who initiates a loan request has high credibility, which is low in efficiency recognition accuracy, while with a relatively high human cost. Based on this, the embodiments of the present disclosure provide a training method for loan fraud detection model, a loan fraud detecting method and apparatus, and a compute device, which are capable of automatically learning the differences in bank statement records between a normal user and an abnormal user by constructing a neural network, determining the behavior pattern of a user based on the identity information thereof, and rationally representing the user's personal behavior pattern in a model, so as to improve credit platforms' recognition efficiency and recognition accuracy of fraudulent users, and also greatly save the human cost.

The technical solutions of the present disclosure will be clearly and completely described below with reference to the accompanying drawings of the present disclosure. It is apparent that the embodiments described are only some of the embodiments of the present disclosure, rather than all of the embodiments. Generally, the components of the present disclosure described and illustrated in the accompanying drawings herein may be arranged and designed in various different configurations. Thus, the following detailed description of the embodiments of the present disclosure provided in the drawings is not intended to limit the scope of the present disclosure as claimed, but only represents the selected embodiments of the present disclosure. All the other embodiments that are obtained by a person skilled in the art on the basis of the embodiments of the present disclosure without inventive effort shall be covered by the protection scope of the present disclosure.

In order to facilitate understanding of the embodiments, a training method for loan fraud detection model disclosed in an embodiment of the present disclosure is first described in detail.\

Embodiment I

FIG. 1 is a flowchart of a training method for loan fraud detection model according to Embodiment I of the present disclosure. Referring to FIG. 1, the method comprises steps S101-S106, wherein:

S101, acquiring identity information and user's bank statement information of a plurality of sample users, and fraud label information corresponding to each user.

In the specific implementation, the sample users may be selected from the users who have initiated a loan application and to whom a loan is already issued.

The identity information of a user is relevant information for representing the identity of the user, which not only refers to the unique identity information such as ID number, name, etc., but also refers to the identity of the user constituted based on a series of social attributes, for example, the identity information may include the user's education background, occupation, domicile place, gender, age, family relationship, credit information on other platforms, assets situation and so on.

The user's bank statement information may be the statement information of the sample user in a single bank or in multiple banks within a time period having a preset time length before he initiates a loan. The user's bank statement information includes the amount of money the user receives through the bank and the amount of money the user spends through the bank.

The fraud label information corresponding to each sample user may be labelling information assigning a label to the result as to whether the sample user has committed a fraud after his/her borrowing behavior occurs.

S102, constructing, for each sample user, an identity feature vector according to the identity information of the sample user.

Optionally, in the specific implementation, the acquiring of the identity information of the respective sample user is acquiring of feature values of each sample under a plurality of preset identity features. For example, one or more of the user's education background, occupation, domicile place, gender, age, family relationship, credit information on other platforms, and assets situation may be used as the identity feature(s), and then feature value(s) under the identity feature(s) is(are) acquired.

At the time of constructing the identity feature vector based on the identity information, the data form of the original identity information is non-standard, for example, the user's education background includes any one of primary school, junior high school, senior high school, junior college, undergraduate, master and doctor. This kind of description on education background cannot directly constitute the elements in the identity feature vector. Therefore, it is necessary to convert the non-standard data into a form that is consistent in format and convenient for being processed by a computer. For numerical features, ages for example, the corresponding data thereof are directly used to represent the elements in the identity feature vector; and for categorial features, for example, the user's education background, the one-hot encoding method is used, that is, each categorial feature corresponds to a vector composed of 0 and 1, and when the feature of this dimension takes different values, the corresponding position in this vector takes 1, while all the other parts are set to 0.

After the identity information is standardized to obtain the feature values of the sample user under a plurality of identity features, an identity feature vector of the sample user is generated according to the feature values of the sample user under the plurality of identity features.

The identity feature vector can represent the identity of the corresponding sample user.

Figure 14:
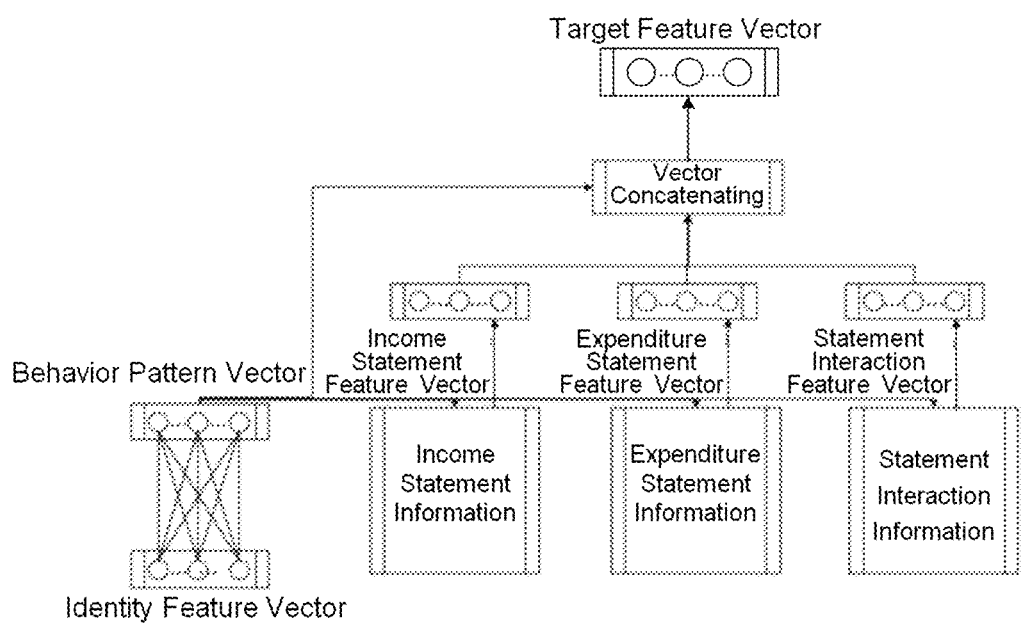
FIG. 14 is a flowchart of constructing a target feature vector provided in an embodiment of the present disclosure.

FIG. 14 is a flowchart of a method of constructing a target feature vector according to an embodiment of the present disclosure. Referring to FIG. 14, the method comprises steps in S103-S105, which are described in detail as follows:

S103, non-linearly transforming the identity feature vector using a first vector transformation matrix to obtain a behavior pattern vector of the sample user.

In the specific implementation, it is feasible to calculate the product of the identity feature vector and the first vector transformation matrix, and perform non-linear operation on the result of the product of the identity feature vector and the first vector transformation matrix by using a preset non-linear transformation function, to obtain the behavior pattern vector of this sample user.

In the above, the first vector transformation matrix is a parameter matrix of the loan fraud detection model, and the process of training the loan fraud detection model includes a process of adjusting the first vector transformation matrix.

For example, calculation may be made with reference to the following formula:

$$V_u = \tan h(M \times X_u) \quad (1\text{-}1)$$

where $V_u$ is u an element of the behavior pattern vector, $X_u$ is an element of the identity feature vector, M is the first vector transformation matrix, and tan h is a hyperbolic tangent function, i.e., the non-linear transformation function in the present disclosure.

In the above, the calculation method of the hyperbolic tangent function is:

$$\tanh x = \frac{\sinh x}{\cosh x} = \frac{e^x - e^{-x}}{e^x + e^{-x}} \quad (1\text{-}2)$$

where x is a parameter, and with reference to the formula (1-1), here $x = M \times X_u$.

S104, constructing a statement feature vector of the sample user according to the behavior pattern vector of the sample user, a second vector transformation matrix and the user's bank statement information.

Optionally, in the specific implementation, the user's bank statement information may include: income statement information and expenditure statement information; wherein the income statement information is the income amount of the user, and the expenditure statement information is the expenditure amount of the user. In order to represent the user's income and expenditure condition, in the embodiment of the present disclosure, an income statement feature vector, an expenditure statement feature vector and a statement interaction feature vector are constructed, and the user's income and expenditure condition is represented by the three vectors collectively.

Specifically, the income statement feature vector is generated according to the income statement information, the second vector transformation matrix, and the behavior pattern vector of the user; each element in the income feature vector is a numerical value obtained by transforming the total income amount of the corresponding user on a certain day using the behavior pattern vector and the second vector transformation matrix; and each element in the expenditure statement feature vector is a numerical value obtained by transforming the total expenditure amount of the corresponding sample user on a certain day using the behavior pattern vector and the second vector transformation matrix.

The statement interaction feature vector is constituted by the income statement information, the expenditure statement information, the user's behavior pattern vector, and the second vector transformation matrix collectively. The statement interaction feature vector is generated in the following way, i.e., first, generating the daily total income according to the income statement information and generating the daily total expenditure according to the expenditure statement information, then calculating the difference between the daily total income and the daily total expenditure and transforming the difference according to the user's behavior pattern vector and the second vector transformation matrix, and finally generating the statement interaction feature vector.

The second vector transformation matrix is a parameter matrix of the loan fraud detection model. It should be noted that the second vector transformation matrices corresponding to the above described income statement feature vector, the expenditure statement feature vector and the statement interaction feature vector may be the same or may be different, and are collectively referred to as the second vector transformation matrix only in the present disclosure. That is, the second vector transformation matrix may include one, two or three kinds of parameter matrices.

Figure 2:
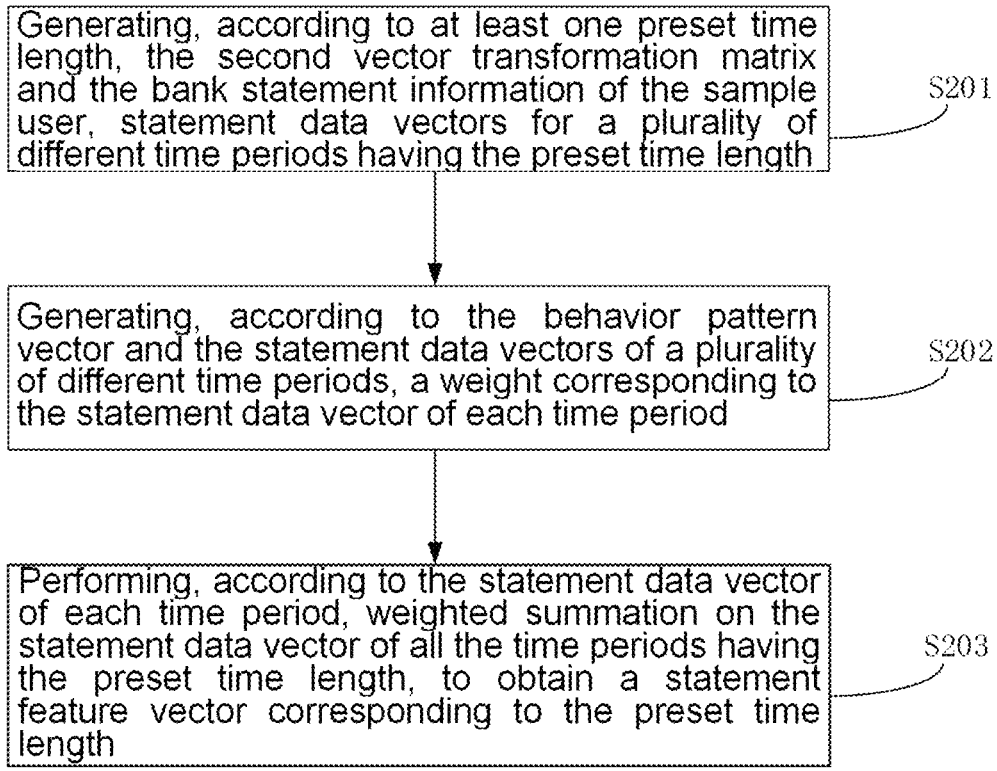
FIG. 2 is a flowchart of a method for constructing a statement feature vector according to user's bank statement information, a user's behavior pattern vector and a second vector transformation matrix provided in an embodiment of the present disclosure.

In addition, the statement feature vector can represent the user's expenditure and income condition. For normal users, since their working state, consumption habits, etc., generally have certain stability, the expenditure and income condition thereof over a relatively long period of time will generally be maintained in relatively stable state. Moreover, since the income of the user is usually periodic income and the expenditure is also related to the periodic income, referring to FIG. 2, the specific method of constructing a statement feature vector according to the user's bank statement information, the user's behavior pattern vector and the second vector transformation matrix according to an embodiment of the present disclosure comprises the following steps:

S201, generating, according to at least one preset time length, the second vector transformation matrix and the bank statement information of the sample user, statement data vectors for a plurality of different time periods having the preset time length;

S202, generating, according to the behavior pattern vector and the statement data vectors of a plurality of different time periods, a weight corresponding to the statement data vector of each time period; and S203, performing, according to the statement data vector of each time period, weighted summation on the statement data vectors of each of the time periods having the preset time length, to obtain a statement feature vector corresponding to the preset time length.

In the specific implementation, the number of preset time lengths and the duration of each preset time length may be set according to actual needs. For each preset time length, after the statement data vectors of a plurality of different time periods having the preset time length are generated for the preset time length, the weight corresponding to the statement data vector of each time period is constructed according to the preset time length, the second vector transformation matrix and the behavior pattern vector, and then weighted summation is performed on the statement data vectors of a plurality of different time periods having the preset time length, to obtain a statement feature vector corresponding to the preset time length.

Here, the generated statement feature vectors are in one-to-one correspondence with the preset time lengths. Moreover, different preset time lengths may correspond to the same number of or different numbers of time periods.

Specifically, the statement data vectors are generated by at least the following two methods:

Method I: in general, for each preset time length, each element in the statement data vectors of a plurality of time periods having the preset time length is the data obtained after transforming, using the behavior pattern vector and the second vector transformation matrix, the user's daily statement data within each time period having the preset time length.

Taking the case as an example where the statement data is the expenditure statement data and the generated statement data vectors are the expenditure statement data vectors, assuming that the preset time length is 7 days, the generated expenditure statement feature vector of a plurality of time periods having a time length of 7 days includes 7 elements, wherein each element is a numerical value obtained by transforming, using the behavior pattern vector and the second vector transformation matrix, the total expenditure amount of the sample user; and the 7 elements are the numerical values obtained by transforming, using the behavior pattern vector and the second vector transformation matrix, the daily total expenditure amount of the sample user over 7 consecutive days.

Method II: if the statement data vectors are constructed directly according to the user's bank statement information, there will be a relatively large fluctuation in the data, and this fluctuation will bring some unstable factors to the model; although the data will be transformed using the user's behavior pattern vector and the second vector transformation matrix, the above described unstable factors still cannot be eliminated. In addition, different sample users have different incomes and different expenditures as well, and these differences also usually tend to result in too much difference between different sample data, which may cause the problem of excessively low convergence speed of model training, etc. Therefore, in order to enhance the robustness of the model and/or to reduce the difference between different sample data, in another embodiment of the present disclosure, detailed description will be further made on transforming data vectors composed of original data according to the second vector transformation matrix, so as to generate the statement data vectors.

Figure 3:
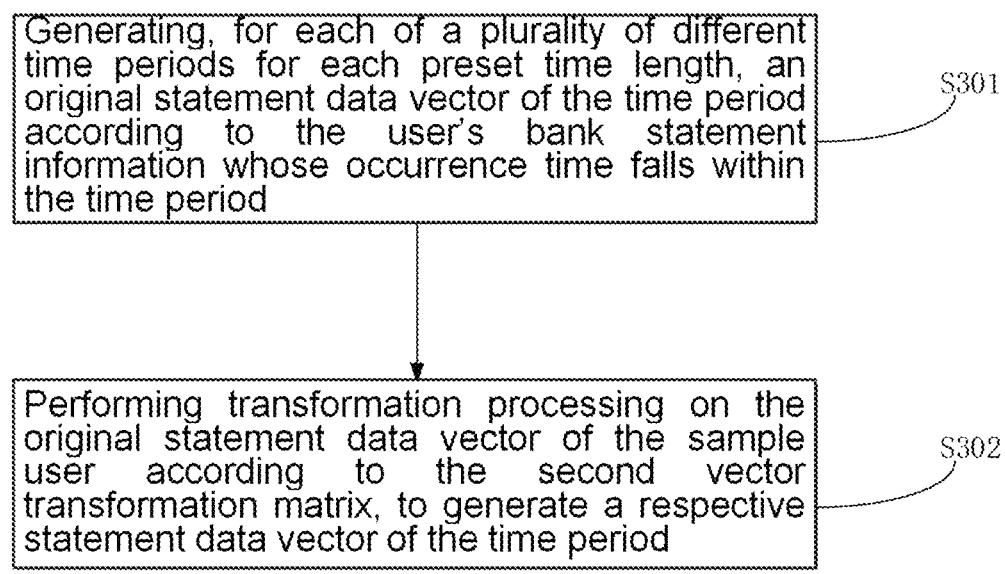
FIG. 3 is a flowchart of a method for generating statement data vectors for a plurality of different time periods having a preset time length provided in an embodiment of the present disclosure.

Referring to FIG. 3, statement data vectors of a plurality of different time periods having a preset time length may be generated in the following manner:

S301, generating, for each of a plurality of different time periods for each preset time length, an original statement data vector of the time period according to the user's bank statement information whose occurrence time falls within the time period.

Here, the original statement data vectors A1-Am generated for m time periods having a time length of n days are represented respectively as:

A1=$[a_{11}, a_{12}, a_{13}, \ldots, a_{1n}]$, A2=$[a_{21}, a_{22}, a_{23}, \ldots, a_{2n}]$, . . . Am=$[a_{m1}, a_{m2}, a_{m3}, \ldots, a_{mn}]$.

In the above, each element in each original statement data vector is the user's bank statement information of each day in the corresponding time period. If the original statement data vector is constructed based on the expenditure statement information, each element in the original statement data vector is the total expenditure amount of each day in the corresponding time period; if the original statement data vector is constructed based on the income statement information, each element in the original statement data vector is the total income amount of each day in the corresponding time period; and if the original statement data vector is constructed based on the statement interaction information, each element in the original statement data vector is the difference between the daily total income amount and the daily total expenditure amount in the corresponding time period.

S302, performing transformation processing on each original statement data vector of the sample user according to the second vector transformation matrix, to generate a respective statement data vector of the time period.

Optionally, it is feasible to first perform robustness enhancing transformation on the original data vector, and/or perform difference elimination transformation on the original statement data vector, to generate a respective transformed statement data vector of the time period, and then transform the transformed statement data vector according to the second vector transformation matrix, to generate a respective statement data vector.

(1) Performing transformation processing on each original statement data vector comprises: in the case of performing robustness enhancing transformation on the original statement data vector, performing robustness enhancing transformation on the original statement data vector in the following manner:

performing robustness enhancing transformation on the original statement data vector based on the sliding window method, to generate a transformed statement data vector of the time period.

Here, the performing robustness enhancing transformation on the original statement data vector based on the sliding window method is to select a plurality of elements from the original statement data vector for multiple times according to a window having a preset size, and generate, for each selection, transformed data corresponding to the selection according to the plurality of elements selected this time;

constitute the respective transformed statement data vector according to the transformed data corresponding to each selection;

wherein the plurality of elements selected the first time include the first element in the original statement data vector; the plurality of elements selected the last time include the last element in the original statement data vector; and for every two consecutive selections, a preset step length interval is provided between the position of the first element in the former selection and the position of the first element in the latter selection.

Either of the following two methods may be employed for generating the transformed data corresponding to this selection according to the plurality of elements selected this time:

Method I: performing weighted summation on the plurality of elements selected this time, and taking the result of the weighted summation as the transformed data corresponding to this selection, wherein the weights of the plurality of elements selected each time may be set specifically according to actual needs.

Method II: using the average values of the plurality of elements selected this time as the transformed data corresponding to the selection, wherein here, this method may be regarded as a special weighted summation, that is, the weights of the selected plurality of elements are all the same.

For example, each original statement data vector is transformed by using the sliding window method (the example window size is 3 and the step length is 1 in the figure) to obtain a transformed statement data vector corresponding to each original statement data vector, and the average value of the selected plurality of elements is used as the transformed data corresponding to this selection, then the original statement data vectors A1-Am generated based on the transformed statement data vectors constituted by the transformed data, with m time periods and a time length of n days, are represented respectively as follows:

A1=[$a_{11}$, $a_{12}$, $a_{13}$, ... , $a_{1n}$], A2=[$a_{21}$, $a_{22}$, $a_{23}$, ... , $a_{2n}$], ... Am=[$a_{m1}$, $a_{m2}$, $a_{m3}$, ... , $a_{mn}$].

The transformed statement data vectors B1-Bm generated by performing robustness enhancing transformation on the original statement data vectors A1-Am are respectively:

$$B1 = \left[\frac{a_{11} + a_{12} + a_{13}}{3}, \frac{a_{12} + a_{13} + a_{14}}{3}, \frac{a_{13} + a_{14} + a_{15}}{3}, \ldots, \frac{a_{1(n-2)} + a_{1(n-1)} + a_{1n}}{3}\right];$$

$$B2 = \left[\frac{a_{21} + a_{22} + a_{23}}{3}, \frac{a_{22} + a_{23} + a_{24}}{3}, \frac{a_{23} + a_{24} + a_{25}}{3}, \ldots, \frac{a_{2(n-2)} + a_{2(n-1)} + a_{2n}}{3}\right];$$

...

$$Bm = \left[\frac{a_{m1} + a_{m2} + a_{m3}}{3}, \frac{a_{m2} + a_{m3} + a_{m4}}{3}, \frac{a_{m3} + a_{m4} + a_{m5}}{3}, \ldots, \frac{a_{m(n-2)} + a_{m(n-1)} + a_{mn}}{3}\right].$$

It should be noted that the above transformation is merely one example of data transformation by the sliding window method, and the original statement data vectors may also be transformed using other window sizes and step lengths.

(2) Performing transformation processing on each original statement data vector comprises: in the case of performing difference elimination transformation on the original statement data vector, performing difference elimination transformation on the original statement data vector in the following manner:

calculating, for each non-first element of the original statement data vector, an absolute value of the difference between the non-first element and the previous element adjacent to the non-first element, and using the ratio of the absolute value to the non-first element as a difference elimination transformation result of the non-first element;

for the first element in the original statement data vector, taking 1 as the difference elimination transformation result of the first element; and constituting the respective transformed statement data vector by using the difference elimination transformation result of the first element in the original statement data vector and the difference elimination transformation result of each of the non-first elements in the original statement data vector.

For example, the average value of the selected plurality of elements is used as the transformed data corresponding to this selection, then the original statement data vectors A1-Am generated based on the transformed statement data vectors constituted by the transformed data, with m time periods and a time length of n days, are respectively as follows:

A1=[$a_{11}$, $a_{12}$, $a_{13}$, ... , $a_{1n}$], A2=[$a_{21}$, $a_{22}$, $a_{23}$, ... , $a_{2n}$], ... Am=[$a_{m1}$, $a_{m2}$, $a_{m3}$, ... , $a_{mn}$].

The transformed statement data vectors V1-Vm generated by performing difference elimination transformation on the original statement data vectors A1-Am are respectively:

$$V1 = \left[\frac{|a_{11} - 0|}{a_{11}}, \frac{|a_{12} - a_{11}|}{a_{12}}, \frac{|a_{13} - a_{12}|}{a_{13}}, \ldots, \frac{|a_{1n} - a_{1(n-1)}|}{a_{1n}}\right];$$

$$V2 = \left[\frac{|a_{21} - 0|}{a_{21}}, \frac{|a_{22} - a_{21}|}{a_{22}}, \frac{|a_{23} - a_{22}|}{a_{23}}, \ldots, \frac{|a_{2n} - a_{2(n-1)}|}{a_{2n}}\right];$$

...

$$Vm = \left[\frac{|a_{m1} - 0|}{a_{m1}}, \frac{|a_{m2} - a_{m1}|}{a_{m2}}, \frac{|a_{m3} - a_{m2}|}{a_{m3}}, \ldots, \frac{|a_{mn} - a_{m(n-1)}|}{a_{mn}}\right].$$

(3) Performing transformation processing on each original statement data vector comprises: in the case of performing robustness enhancing transformation and difference elimination transformation on the original statement data vector, performing robustness enhancing transformation and difference elimination transformation on the original statement data vector in the following manner:

performing robustness enhancing transformation on the original statement data vector based on the sliding window method, to generate the respective transformed statement data vector;

calculating, for each non-first element of the transformed vector, an absolute value of the difference between the non-first element and the previous element adjacent to the non-first element, and using the ratio of the absolute value to the non-first element as a difference elimination transformation result of the non-first element;

for the first element in the transformed vector, taking 1 as the difference elimination transformation result of the first element; and constituting the transformed statement data vector by using the difference elimination transformation result of the first element in the transformed vectors and the difference elimination transformation result of each of the non-first elements in the transformed vector.

For example, the average values of the selected plurality of elements is used as the transformed data corresponding to this selection, then the original statement data vectors A1-Am generated based on the transformed statement data vectors constituted by the transformed data, with m time periods and a time length of n days are respectively as follows:

$A1=[a_{11}, a_{12}, a_{13}, \ldots, a_{1n}]$, $A2=[a_{21}, a_{22}, a_{23}, \ldots, a_{2n}]$, $\ldots$ $Am=[a_{m1}, a_{m2}, a_{m3}, \ldots, a_{mn}]$.

Figure 10:
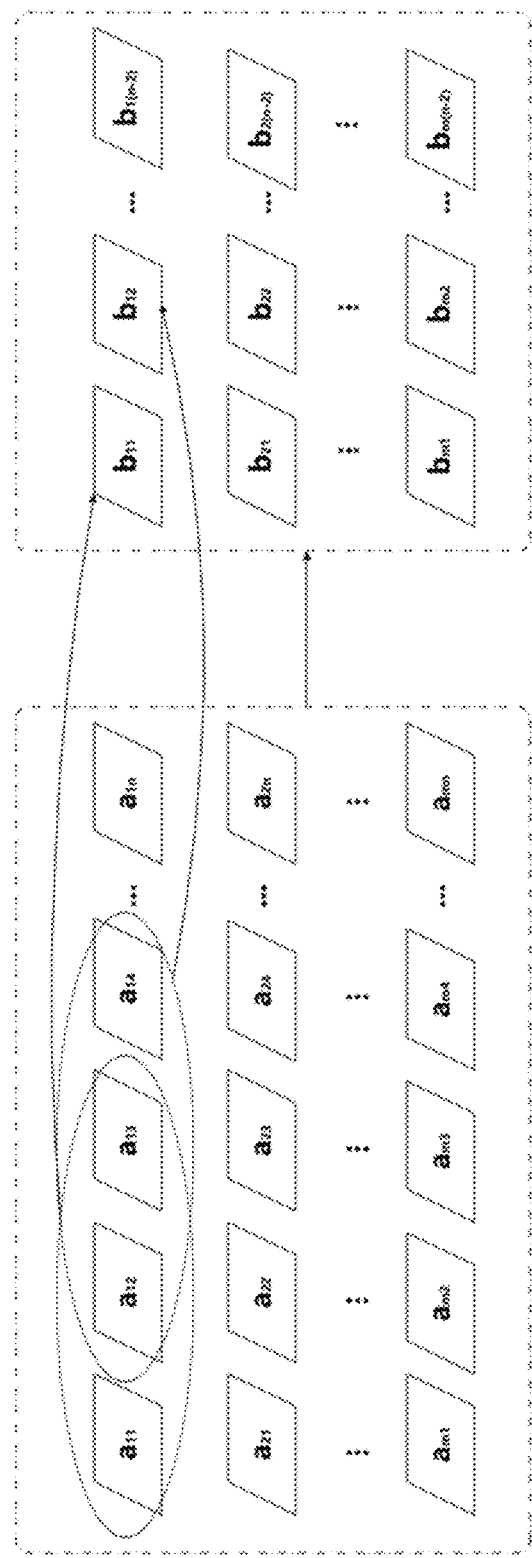
FIG. 10 is a schematic diagram of transforming an original statement data vector using a sliding window method to generate a transformed vector provided in an embodiment of the present disclosure.

The original statement data vectors are transformed by using the sliding window method (the example window size is 3 and the step length is 1 in the figure), the transformation process is as shown in FIG. 10, and the obtained transformed vectors B1-Bm corresponding to the original statement data vectors are respectively:

$$B1 = [b_{11}, b_{12}, b_{13}, \ldots b_{1(n-2)}] = \left[\frac{a_{11}+a_{12}+a_{13}}{3}, \frac{a_{12}+a_{13}+a_{14}}{3}, \frac{a_{13}+a_{14}+a_{15}}{3}, \ldots, \frac{a_{1(n-2)}+a_{1(n-1)}+a_{1n}}{3}\right];$$

$$B2 = [b_{21}, b_{22}, b_{23}, \ldots b_{2(n-2)}] = \left[\frac{a_{21}+a_{22}+a_{23}}{3}, \frac{a_{22}+a_{23}+a_{24}}{3}, \frac{a_{23}+a_{24}+a_{25}}{3}, \ldots, \frac{a_{2(n-2)}+a_{2(n-1)}+a_{2n}}{3}\right];$$

Figure 11:
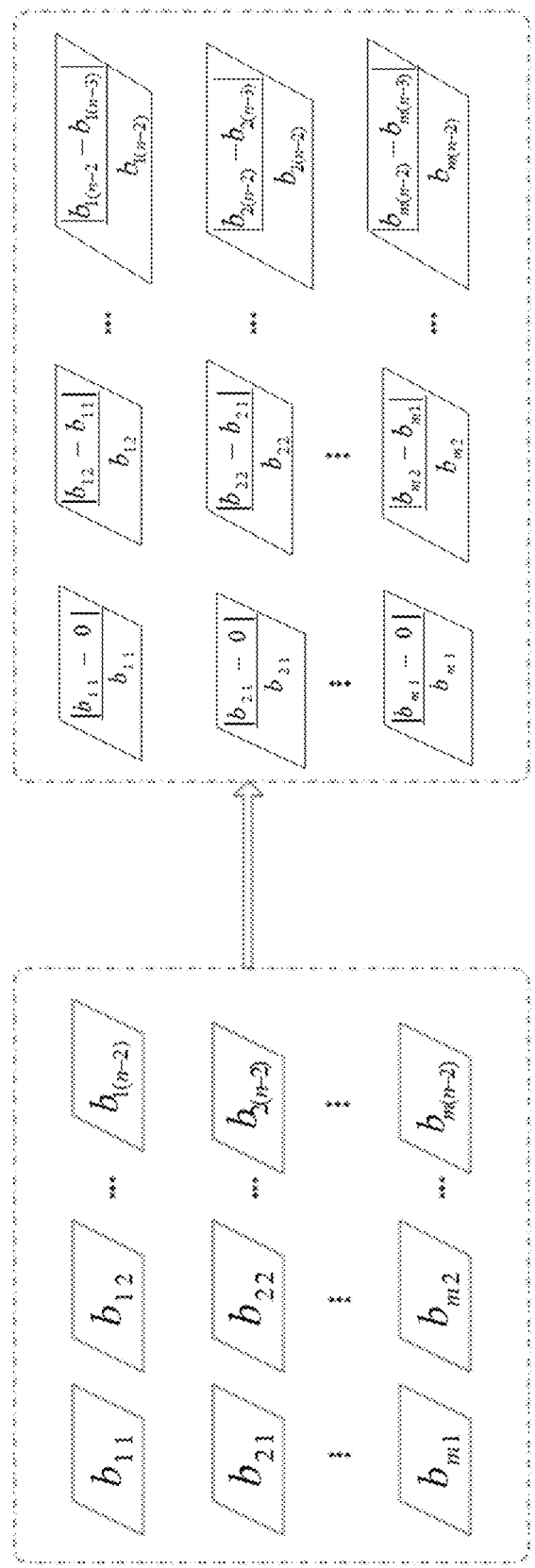
FIG. 11 is a schematic diagram of performing difference elimination transformation on the transformed vector to obtain a transformed statement data vector provided in an embodiment of the present disclosure.

...

$$Bm = [b_{m1}, b_{m2}, b_{m3}, \ldots b_{m(n-2)}] = \left[\frac{a_{m1}+a_{m2}+a_{m3}}{3}, \frac{a_{m2}+a_{m3}+a_{m4}}{3}, \frac{a_{m3}+a_{m4}+a_{m5}}{3}, \ldots, \frac{a_{m(n-2)}+a_{m(n-1)}+a_{mn}}{3}\right];$$

then difference elimination transformation is performed on the transformed data vectors B1-Bm respectively, the transformation process is as shown in FIG. 11, and the obtained transformed statement data vectors V1-Vm are respectively:

$$V1 = \left[\frac{|b_{11}-0|}{b_{11}}, \frac{|b_{12}-b_{11}|}{b_{12}}, \frac{|b_{13}-b_{12}|}{b_{13}}, \ldots, \frac{|b_{1(n-2)}-b_{1(n-3)}|}{b_{1(n-2)}}\right];$$

$$V2 = \left[\frac{|b_{21}-0|}{b_{21}}, \frac{|b_{22}-b_{21}|}{b_{22}}, \frac{|b_{23}-b_{22}|}{b_{23}}, \ldots, \frac{|b_{2(n-2)}-b_{2(n-3)}|}{b_{2(n-2)}}\right];$$

...

$$Vm = \left[\frac{|b_{m1}-0|}{b_{m1}}, \frac{|b_{m2}-b_{m1}|}{b_{m2}}, \frac{|b_{m3}-b_{m2}|}{b_{m3}}, \ldots, \frac{|b_{m(n-2)}-b_{m(n-3)}|}{b_{m(n-2)}}\right].$$

Figure 4:
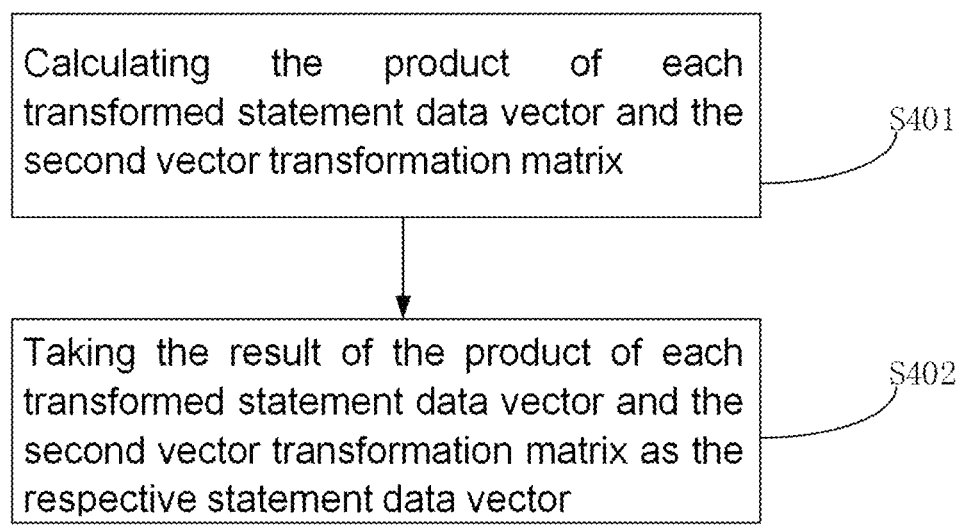
FIG. 4 is a flowchart of a method for constructing a statement data vector after obtaining a transformed statement data vector provided in an embodiment of the present disclosure.

After the transformed statement data vectors are obtained by the above method, the statement data vectors may be constructed by the method as shown in FIG. 4, which comprises following steps:

S401, calculating the product of each transformed statement data vector and the second vector transformation matrix; and S402, taking the result of the product of each transformed statement data vector and the second vector transformation matrix as the respective statement data vector.

Figure 12:
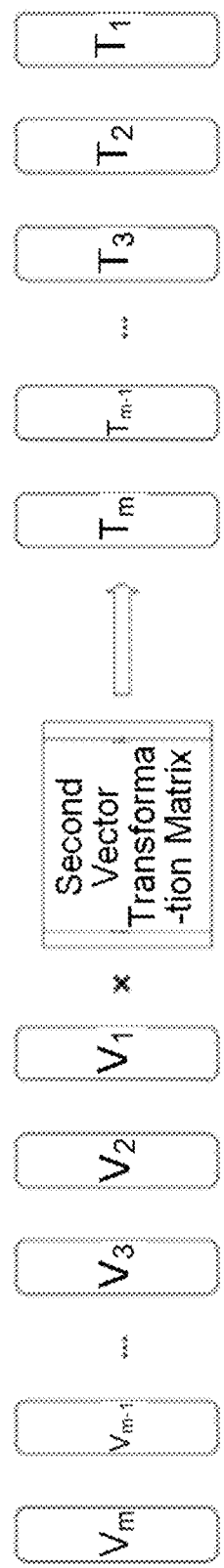
FIG. 12 is a schematic diagram of performing statement information transformation on the transformed statement data vector according to the second vector transformation matrix provided in an embodiment of the present disclosure.

The specific process of transforming the transformed statement data vectors using the second vector transformation matrix is as shown in FIG. 12. The transformed statement data vectors V1-Vm are respectively:

$$V1 = \left[\frac{|b_{11}-0|}{b_{11}}, \frac{|b_{12}-b_{11}|}{b_{12}}, \frac{|b_{13}-b_{12}|}{b_{13}}, \ldots, \frac{|b_{1(n-2)}-b_{1(n-3)}|}{b_{1(n-2)}}\right];$$

$$V2 = \left[\frac{|b_{21}-0|}{b_{21}}, \frac{|b_{22}-b_{21}|}{b_{22}}, \frac{|b_{23}-b_{22}|}{b_{23}}, \ldots, \frac{|b_{2(n-2)}-b_{2(n-3)}|}{b_{2(n-2)}}\right];$$

...

$$Vm = \left[\frac{|b_{m1}-0|}{b_{m1}}, \frac{|b_{m2}-b_{m1}|}{b_{m2}}, \frac{|b_{m3}-b_{m2}|}{b_{m3}}, \ldots, \frac{|b_{m(n-2)}-b_{m(n-3)}|}{b_{m(n-2)}}\right].$$

Assuming that the second vector transformation matrix is N, the statement data vectors are:

$T1=V1*N$ $T2=V2*N$, ..., $Tm=Vm*N$.

In the above, the second vector transformation matrix is a parameter matrix of the loan fraud detection model, and the process of training the loan fraud detection model includes a process of adjusting the second vector transformation matrix.

After the statement data vectors of a plurality of different time periods having a preset time length is generated, it is possible to generate, according to the behavior pattern vector and the statement data vectors of a plurality of different time periods, the weight corresponding to the respective statement data vector of each time period.

For example, the weighting coefficient $\alpha_k$ for performing weighted summation on the respective statement data vector of each of the plurality of different time periods having the preset time length according to the behavior pattern vector and a plurality of different time periods may be generated using the following formula:

$$\alpha_k = \frac{e^{V_u \times T_k}}{\sum_{p=1}^{m} e^{V_u \times T_p}} \quad (1\text{-}3)$$

where $V_u$ represents the behavior pattern vector, m represents the number of statement data vectors, and k represents the k th statement data vector.

Figure 13:
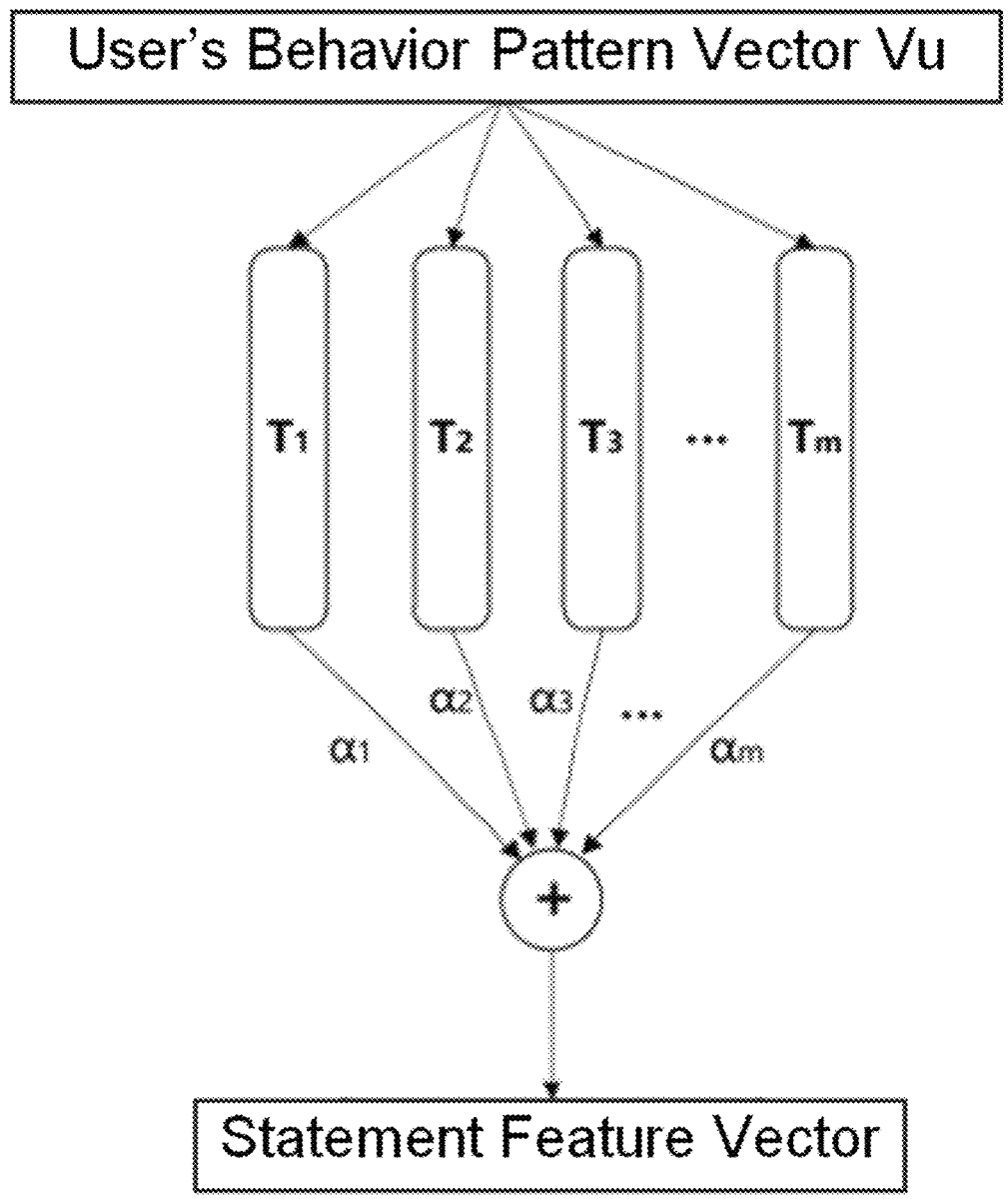
FIG. 13 is a schematic diagram of performing weighted summation on the statement data vector to obtain a statement feature vector provided in an embodiment of the present disclosure.

The process of performing weighted summation on the statement data vectors T1-Tm of a plurality of different time periods having the preset time length based on the weighting coefficient $\alpha_k$ to obtain statement feature vectors is as shown in FIG. 13.

Specifically, the behavior pattern vector per se can represent the behavior pattern of the user, and a larger numerical value of the respective element in the behavior pattern vector proves higher importance of the respective behavior among the user's behaviors and higher concentration of the user's "attention" on the behavior. After the weight corresponding to the respective statement data vector of each time period are generated according to the behavior pattern vector and the statement data vectors of a plurality of different time periods, in the results of weighted summation of the statement data vector of each time period having the preset time length, the influence of the corresponding behavior on the constituted statement feature vector is accordingly greater, and when the model is trained based on such statement feature vectors, the loan fraud detection model is accordingly more largely influenced by the important behaviors of the user, and in this way, thereby the attention mechanism-based training of the loan fraud detection model is realized.

In addition, in another embodiment of the present disclosure, before constructing the statement feature vectors, the following may be further included: performing at least one of the following processing on the bank statement data: data cleaning processing, data enhancement processing, and feature selection and standardization processing.

1. Data cleaning processing: Since errors and loss may occur in the process of data acquisition and transmission, the function of the model is to clear off the data with abnormal feature distribution and fill the feature data with missing value. The algorithm used for clearing off abnormal data portion is the isolation forest (IForest) model, which is composed of random decision trees. For each decision tree, at the time of splitting a leaf node, the node categorization operation is always performed by randomly selecting target features from all the feature sets and randomly selecting the threshold of the target features. When a tree is generated, each original data sample uniquely corresponds to one leaf node in the tree, and the leaf node corresponding to an abnormal sample is often at a higher layer. At the time of processing the feature data with missing value, for the missing category features, the category with the most frequent occurrence in the sample set is directly filled; and for the missing numerical features, the average value of the feature of this dimension occurring in the sample set is directly filled.

2. Data enhancement processing: If the positive and negative samples in the cleaned data are very unbalanced, for example, the number of behaviors of normal users is much larger than that of the fraudulent users, the unbalanced samples will bring great difficulties to the training of the model. In this stage, the data enhancement algorithm of Synthetic Minority Oversampling Technique (Smote) is employed to augment the behavior data of the fraudulent users. In this algorithm, all the fraudulent users are mapped into a feature space, then each fraudulent user will correspond to one point in the space, one point on the connection line between corresponding points of any two fraudulent user is used as a newly generated fraudulent user data point each time, any number of fraudulent user data points may be generated by repeating the above operations, and the generated data amount of fraudulent users and the data amount of normal users are finally controlled to reach a preset ratio, for example, the ratio of the generated data amount of fraudulent user to data amount of the normal user is controlled to be between 1:3 and 1:4.

3. Feature selection and standardization processing: The purpose of feature selection is to reduce the dimension of the features and remove the features of relatively low importance, which will be beneficial to the improvement of model's training speed and the improvement of model's recognition accuracy. The dimension reduction method adopted in the module is Principal Component Analysis (PCA), that is, performing linear conversion on the original features to map the original features of high dimension to features of low dimension, such that the features after conversion have lower correlation there between, and can more effectively reflect the essential information of the target data. The purpose of feature standardization is to map the numerical values of the features of various dimensions to a same range, which can eliminate the dimensional influence among different features, and can be more conducive to model training. The method adopted in the module is (0, 1) standardization, i.e., converting all the feature data into standard data with an average value of 0 and a variance of 1.

S105, concatenating the behavior pattern vector with the statement feature vector of a sample user to generate a target feature vector of the sample user.

S106, feeding a target neural network with the target feature vector of each sample user, and acquiring a fraud detection result of the target feature vector of each sample user.

In the specific implementation, the target neural network comprises a feature extraction network and a categorizer. The feature extraction network is configured to perform feature extraction on the target feature vectors, extracting therefrom a feature capable of indicating whether the user's behavior of loan application is a fraud behavior, and then feeding the categorizer with the extracted feature to obtain a fraud detection result of each sample user.

Optionally, the categorizer may be a softmax categorizer, and the neuron activation function of the softmax categorizer may be a Sigmoid activation function, as shown in the formula:

$$\sigma(x_i) = \frac{1}{1+e^{-x_i}}$$

where $x_i$ represents the result of the feature extraction network performing feature extraction on the target feature vectors. A probability value between 0 and 1 can be obtained via the above activation function formula, and a fraud recognition result can be obtained from this probability value. For example, the fraud recognition result of a probability value closer to 1 is fraud, and the fraud recognition result of a probability value closer to 0 is normal.

S107, training the target neural network, the first vector transformation matrix and the second vector transformation matrix according to the fraud detection result of each sample user and the corresponding fraud label information to obtain a loan fraud detection model.

Figure 5:
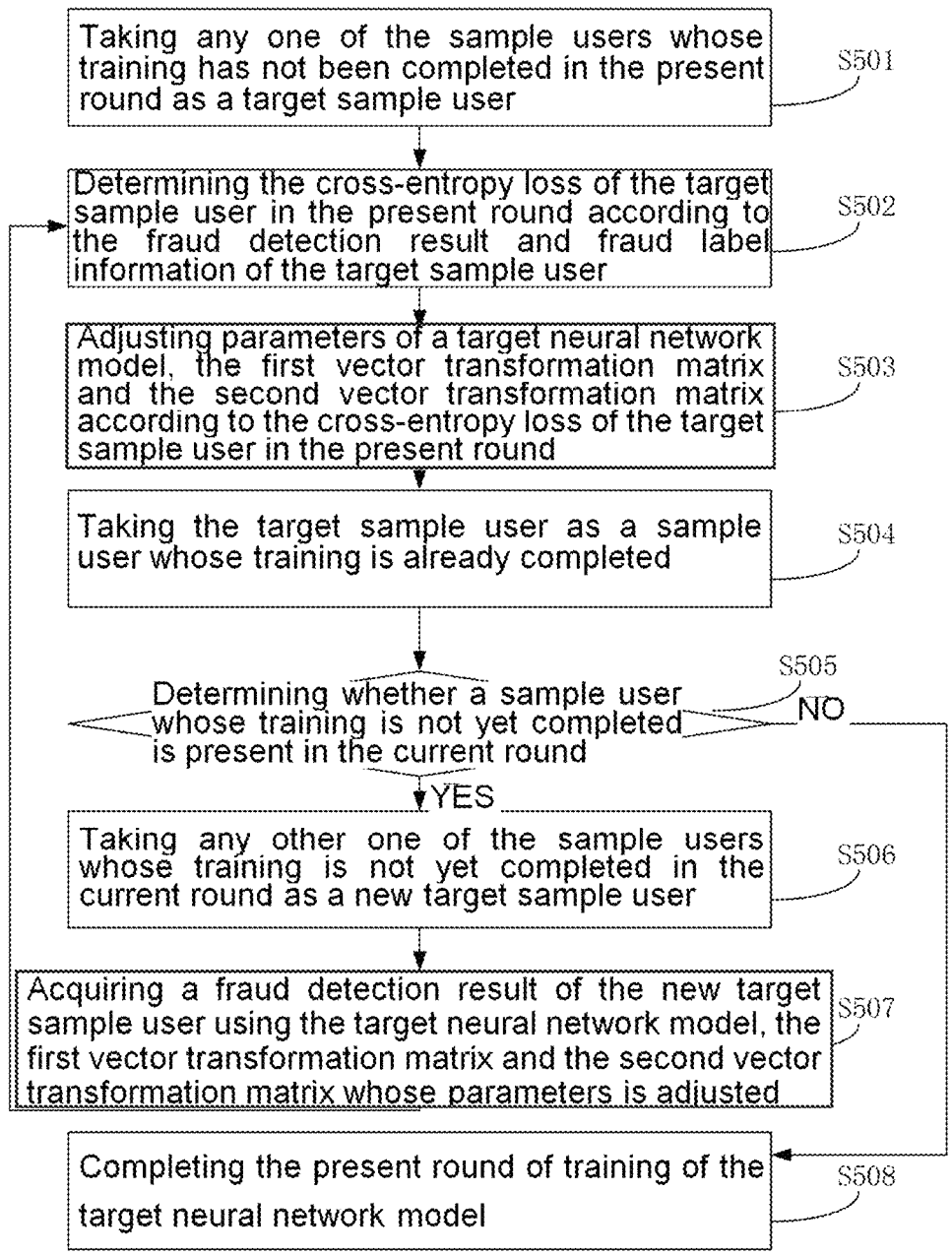
FIG. 5 is a flowchart of a method for training the target neural network, the first vector transformation matrix and the second vector transformation matrix according to the fraud detection result and corresponding fraud label information provided in an embodiment of the present disclosure.

In the specific implementation, referring to FIG. 5, the step of training the target neural network, the first vector transformation matrix and the second vector transformation matrix according to the fraud detection result and the corresponding fraud label information comprises:

S501, taking any one of the sample users whose training is not yet completed in the present round as a target sample user;

S502, determining the cross-entropy loss of the target sample user in the present round according to the fraud detection result and the fraud label information of the target sample user;

S503, adjusting parameters of a target neural network model, the first vector transformation matrix and the second vector transformation matrix according to the cross-entropy loss of the target sample user in the present round;

S504, taking the target sample user as a sample user whose training is already completed;

S505, determining whether a sample user whose training is not yet completed is present in the current round;

if the determination result is YES, sequentially executing steps S506 and S507; and if the determination result is NO, executing step S508;

S506, taking any other one of the sample users whose training is not yet completed in the current round as a new target sample user;

S507, acquiring a fraud detection result of the new target sample user using the target neural network model, the first vector transformation matrix and the second vector transformation matrix whose parameters is already adjusted, and returning to S502; and S508, completing the present round of training of the target neural network model.

After several rounds of training of the target neural network model, the first vector transformation matrix and the second vector transformation matrix, the loan fraud detection model is acquired.

After the completion of the present round of training of the target neural network model, the first vector transformation matrix and the second vector transformation matrix, a fraud recognition model is acquired by the following three methods in an embodiment of the present disclosure:

Method I: checking whether a preset number of rounds is reached in the present round, wherein if so, stopping the training of the target neural network model, and using the target neural network model obtained in the last round of training as the loan fraud detection model.

In the specific implementation, at the time of model training, a preset number of training rounds is set in advance, and if it is detected that the preset number of rounds is reached in the present round, the training of the target neural network model is stopped, and the target neural network model obtained in the last round of training is used as the loan fraud detection model.

Method II: verifying a basic recognition model obtained in the present round, using a test set wherein if in the test set, the percentage of the test data whose cross-entropy loss is not greater than a preset threshold for cross-entropy loss is greater than a first preset percentage threshold, with the percentage based on all the test data in the test set, the training of the target neural network model is stopped, and the target neural network model obtained in the last round of training is used as the loan fraud detection model.

Method III: sequentially comparing the cross-entropy loss of each sample user in the present round with the cross-entropy loss of the corresponding sample user in the previous round wherein if the percentage of the sample users whose cross-entropy loss in the present round is greater than the cross-entropy loss of the corresponding sample user in the previous round reaches a second preset percentage threshold, with the percentage based on the number of all the sample users, the training of the target neural network model is stopped, and the target neural network model obtained in the previous round of training is used as the loan fraud detection model.

Here, the training process is a process of continuously decreasing the cross entropy, but excessively high frequency of training may cause the cross entropy to rise, rather than to decrease, so the model obtained in the present round of training with the minimum cross entropy may be selected as the loan fraud detection model.

Optionally, for example, the second preset percentage threshold may be 10%, 5%, 8%, etc.

In the embodiment of the present disclosure, the differences in bank statement records between a normal user and an abnormal user are automatically learned by constructing a neural network, and the other personal attribute information of the user is rationally represented in a model, so as to improve credit platforms' recognition efficiency and recognition accuracy of fraudulent users, and also greatly save the human cost.

Embodiment II

Figure 6:
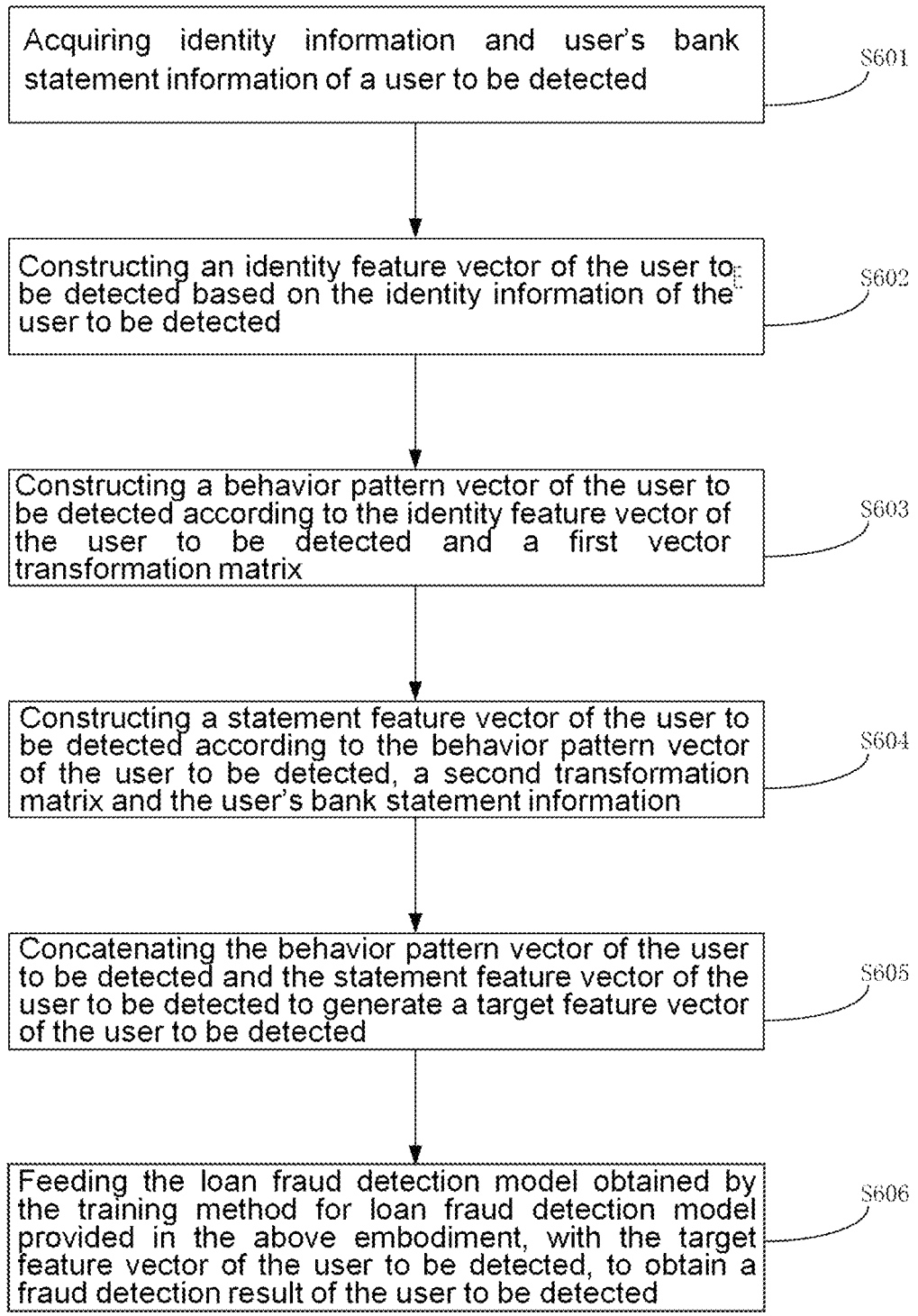
FIG. 6 is a flowchart of a loan fraud detecting method provided in an embodiment of the present disclosure.

Referring to FIG. 6, Embodiment II of the present disclosure further provides a loan fraud detecting method, which comprises steps of:

S601, acquiring identity information and user's bank statement information of a user to be detected;

S602, constructing an identity feature vector of the user to be detected based on the identity information of the user to be detected;

S603, constructing a behavior pattern vector of the user to be detected according to the identity feature vector of the user to be detected and a first vector transformation matrix;

S604, constructing a statement feature vector of the user to be detected according to the behavior pattern vector of the user to be detected, a second transformation matrix and the user's bank statement information;

S605, concatenating the behavior pattern vector of the user to be detected and the statement feature vector of the user to be detected to generate a target feature vector of the user to be detected; and S606, feeding the loan fraud detection model obtained by the training method for loan fraud detection model provided in the above embodiment, with the target feature vector of the user to be detected into, to obtain a fraud detection result of the user to be detected.

Here, the process of S601-S604 resembles the process of S101-S104, and no further description will be made.

In the embodiment of the present disclosure, the differences in bank statement records between a normal user and an abnormal user are automatically learned by constructing a neural network, the behavior pattern of a user is determined based on the identity information thereof, and the user's personal behavior pattern is rationally represented in a model, so as to improve credit platforms' recognition efficiency and recognition accuracy of fraudulent users, and also greatly save the human cost.

Embodiment III

Based on the same inventive concept, an embodiment of the present disclosure further provides a training apparatus for loan fraud detection model corresponding to the training method for loan fraud detection model. Since the principle of problem solving of the apparatus in the embodiments of the present disclosure is similar to that of the above-described training method for loan fraud detection model in the embodiments of the present disclosure, as to the implementation of the apparatus, reference may be made to the implementation of the method, and repeated description is omitted here.

Figure 7:
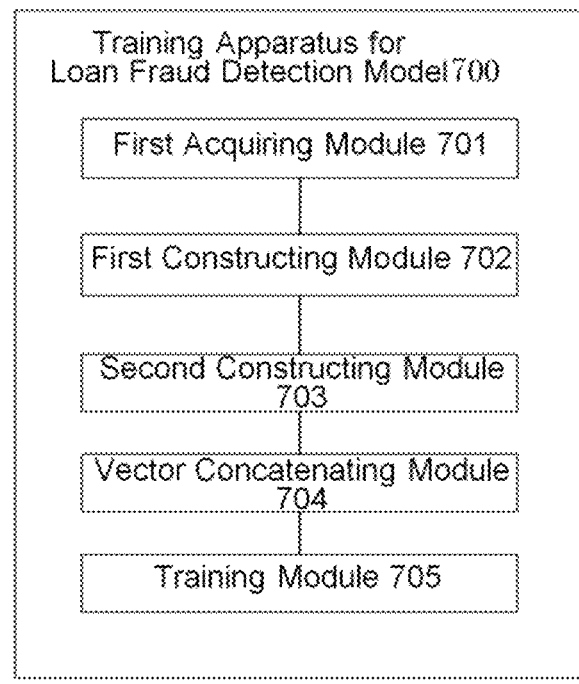
FIG. 7 is a schematic diagram of a training apparatus 700 for loan fraud detection model provided in an embodiment of the present disclosure.

FIG. 7 is a schematic diagram of a training apparatus for loan fraud detection model 700 provided in Embodiment III of the present disclosure. As shown in FIG. 7, the training apparatus for loan fraud detection model 700 comprises:

a first acquiring module 701 configured to acquire identity information and user's bank statement information of a plurality of sample users, and fraud label information corresponding to each sample user;

a first constructing module 702 configured to construct, for each of the sample users, an identity feature vector according to the identity information of the sample user, and non-linearly transform the identity feature vector using a first vector transformation matrix to obtain a behavior pattern vector of the sample user;

a second constructing module 703 configured to construct a statement feature vector of the sample user according to the behavior pattern vector of the sample user, a second vector transformation matrix and the user's bank statement information of the sample user;

a vector concatenating module 704 configured to concatenate the behavior pattern vector with the statement feature vector of the sample user to generate a target feature vector of the sample user, wherein the target feature vector is configured to represent a behavior pattern and an income and expenditure condition of the user; and a training module 705 configured to feed a target neural network with the target feature vector of the sample user, and acquire a fraud detection result of the target feature vector of the sample user; and train the target neural network, the first vector transformation matrix and the second vector transformation matrix according to the fraud detection result of the sample user and corresponding fraud label information to obtain a loan fraud detection model.

Optionally, the identity information includes: feature values under a plurality of identity features;

when configured to construct an identity feature vector according to the identity information of the sample user, the first constructing module 701 is specifically configured to:

generate an identity feature vector of the sample user according to the feature values of the sample user under the plurality of identity features.

Optionally, when configured to construct an identity feature vector according to the identity information of the sample user, and non-linearly transform the identity feature vector using a first vector transformation matrix to obtain a behavior pattern vector of the sample user, the first constructing module 702 is specifically configured to:

calculate the product of the identity feature vector and the first vector transformation matrix, and perform non-linear operation on the result of the product of the identity feature vector and the first vector transformation matrix by using a preset non-linear transformation function, to obtain the behavior pattern vector of the sample user.

Optionally, when configured to construct a statement feature vector of the sample user according to the behavior pattern vector of the sample user, a second vector transformation matrix and the user's bank statement information, the second constructing module 703 is specifically configured to:

generate, according to at least one preset time length, the second vector transformation matrix and the bank statement information of the sample user, statement data vectors for a plurality of different time periods having the preset time length;

generate, according to the behavior pattern vector and the statement data vectors of a plurality of different time periods, a weight corresponding to the statement data vector of each time period; and perform, according to the statement data vector of each time period, weighted summation on the statement data vectors of a plurality of all time periods having the preset time length, to obtain a statement feature vector corresponding to the preset time length.

Optionally, when configured to generate, according to at least one preset time length, the second vector transformation matrix and the bank statement information of the sample user, statement data vectors for a plurality of different time periods having the preset time length, the second constructing module 703 is specifically configured to:

generate, for each of a plurality of different time periods for each preset time length, an original statement data vector of the time period according to the user's bank statement information whose occurrence time falls within the time period; and perform transformation processing on the original statement data vector of the sample user according to the second vector transformation matrix, to generate statement data vectors of the time period.

Optionally, when configured to perform transformation processing on each original statement data vector of the sample user according to the second vector transformation matrix, to generate the respective statement data vector of the time period, the second constructing module 703 is specifically configured to:

perform robustness enhancing transformation on the original statement data vector, and/or perform difference elimination transformation on the original statement data vector, to generate the respective transformed statement data vector, and perform statement information transformation on the transformed statement data vector according to the second vector transformation matrix, to obtain the respective statement data vector of the time period.

Optionally, when configured to perform robustness enhancing transformation on each original statement data vector, the second constructing module 703 is specifically configured to:

perform robustness enhancing transformation on the original statement data vector based on the sliding window method, to generate the respective transformed statement data vector of the time period.

Optionally, when configured to perform robustness enhancing transformation on each original statement data vector based on the sliding window method, to generate the respective transformed statement data vector, the second constructing module 703 is specifically configured to:

select a plurality of elements from the original statement data vector for multiple times according to a window having a preset size, and generate, for each selection, the transformed data corresponding to the selection according to the plurality of elements selected this time;

constitute the respective transformed statement data vector according to the transformation data corresponding to each selection;

wherein the plurality of elements selected the first time include the first element in the original statement data vector; the plurality of elements selected the last time include the last element in the original statement data vector; and for every two consecutive selections, a preset step length interval is provided between the position of the first element in the former selection and the position of the first element in the latter selection.

Optionally, when configured to generate the transformed data corresponding to this selection according to the plurality of elements selected this time, the second constructing module 703 is specifically configured to:

perform weighted summation on the plurality of elements selected this time, and take the result of the weighted summation as the transformed data corresponding to this selection; or use the average values of the plurality of elements selected this time as the transformed data corresponding to this selection.

Optionally, when configured to perform difference elimination transformation on each original statement data vector, the second constructing module 703 is specifically configured to:

calculate, for each non-first element of the original statement data vector, an absolute value of the difference between the non-first element and the previous element adjacent to the non-first element, and use the ratio of the absolute value to the non-first element as a difference elimination transformation result of the non-first element; and constitute the respective transformed statement data vector by using the difference elimination transformation result of the first element in the original statement data vector and the difference elimination transformation result of each of the non-first elements in the original statement data vector.

Optionally, when configured to perform robustness enhancing transformation and difference elimination transformation on each original statement data vector, the second constructing module 703 is specifically configured to:

perform robustness enhancing transformation on the original statement data vector based on the sliding window method, to generate a respective transformed vector;

calculate, for each non-first element of the transformed vector, an absolute value of the difference between the non-first element and the previous element adjacent to the non-first element, and use the ratio of the absolute value to the non-first element as a difference elimination transformation result of the non-first element; and constitute the respective transformed statement data vector by using the difference elimination transformation result of the first element in the transformed vector and the difference elimination transformation result of each of the non-first elements in the transformed vector.

Optionally, when configured to perform statement information transformation on each transformed statement data vector according to the second vector transformation matrix, to obtain the respective statement data vector of the time period, the second constructing module 703 is specifically configured to:

calculate the product of the transformed statement data vector and the second vector transformation matrix; and take the result of the product of the transformed statement data vector and the second vector transformation matrix as the respective statement data vector.

Optionally, the user's bank statement information includes: income statement information and expenditure statement information; and the statement feature vectors include: income statement feature vectors, expenditure statement feature vectors and statement interaction feature vectors;

when configured to construct a statement feature vector of the sample user according to the behavior pattern vector of the sample user, a second vector transformation matrix and the user's bank statement information, the second constructing module 703 is specifically configured to:

generate the income statement feature vector according to the income statement information, the behavior pattern vector and the second vector transformation matrix;

generate the expenditure statement feature vector according to the expenditure statement information, the behavior pattern vector and the second vector transformation matrix; and generate the statement interaction information according to the income statement information and the expenditure statement information, and generate the statement interaction feature vector according to the statement interaction information, the behavior pattern vector and the second vector transformation matrix.

Optionally, when configured to generate the statement interaction information according to the income statement information and the expenditure statement information, the second constructing module 703 is specifically configured to:

generate the daily total income according to the income statement information and generate the daily total expenditure according to the expenditure statement information; and calculate the difference between the daily total income and the daily total expenditure, and constitute the statement interaction information according to the difference.

Optionally, when configured to train the target neural network, the first vector transformation matrix and the second vector transformation matrix according to the fraud detection results of the sample users and corresponding fraud label information, the training module 705 is specifically configured to:

take any one of the sample users whose training is not yet completed in the present round as a target sample user, and determine the cross-entropy loss of the target sample user in the present round according to the fraud detection result and the fraud label information of the target sample user;

adjust parameters of a target neural network model, the first vector transformation matrix and the second vector transformation matrix according to the cross-entropy loss of the target sample user in the present round;

take the target sample user as a sample user whose training is already completed, and take any other one of the sample users whose training is not yet completed in the current round as a new target sample user, acquire a fraud detection result of the new target sample user using the target neural network model, the first vector transformation matrix and the second vector transformation matrix whose parameters is already adjusted, and return to the step of determining the cross-entropy loss of the target sample user in the present round according to the fraud detection result and the fraud label information of the target sample user;

complete the present round of training of the target neural network model when the current round of training for all the sample users is finished; and acquire the loan fraud detection model after several rounds of training of the target neural network model.

Optionally, when configured to complete the present round of training of the target neural network model, the training module 705 is specifically configured to:

check whether a preset number of rounds is reached in the present round, if so, stop the training of the target neural network model, and use the target neural network model obtained in the last round of training as the loan fraud detection model; or verify, using a test set, a basic recognition model obtained in the present round wherein if in the test set, the percentage of the test data whose cross-entropy loss is not greater than a preset threshold for cross-entropy loss is greater than a first preset percentage threshold, with the percentage based on all the test data in the test set, the training of the target neural network model is stopped, and the target neural network model obtained in the last round of training is used as the loan fraud detection model; or sequentially compare the cross-entropy loss of each sample user in the present round with the cross-entropy loss of the corresponding sample user in the previous round wherein if the percentage of the sample users whose cross-entropy loss in the present round is greater than the cross-entropy loss of the corresponding sample user in the previous round reaches a second preset percentage threshold, with the percentage based on the number of all the sample users, the training of the target neural network model is stopped, and the target neural network model obtained in the previous round of training is used as the loan fraud detection model.

In the embodiments of the present disclosure, the differences in bank statement records between a normal user and an abnormal user are automatically learned by constructing a neural network, the behavior pattern of a user is determined based on the identity information thereof, and the user's personal behavior pattern is rationally represented in a model, so as to improve credit platforms' recognition efficiency and recognition accuracy of fraudulent users, and also greatly save the human cost.

Embodiment IV

Figure 8:
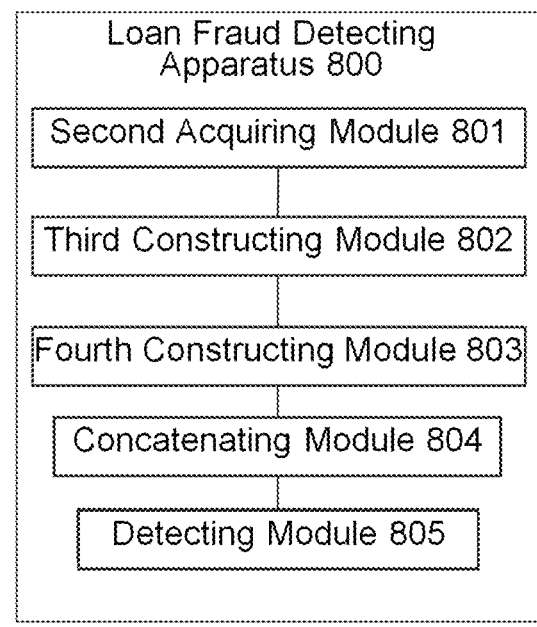
FIG. 8 is a schematic diagram of a loan fraud detecting apparatus 800 provided in an embodiment of the present disclosure.

Referring to FIG. 8, an embodiment of the present disclosure further provides a loan fraud detecting apparatus 800, comprising:

a second acquiring module 801 configured to acquire identity information and user's bank statement information of a user to be detected;

a third constructing module 802 configured to construct an identity feature vector of the user to be detected based on the identity information of the user to be detected; and construct a behavior pattern vector of the user to be detected according to the identity feature vector of the user to be detected and a first vector transformation matrix;

a fourth constructing module 803 configured to construct a statement feature vector of the user to be detected according to the behavior pattern vector of the user to be detected, a second transformation matrix and the user's bank statement information;

a concatenating module 804 configured to concatenate the behavior pattern vector of the user to be detected and the statement feature vector of the user to be detected to generate a target feature vector of the user to be detected; and a detecting module 805 configured to feed the loan fraud detection model obtained by the training method for loan fraud detection model according to any item of the first aspect, with the target feature vector of the user to be detected, to obtain a fraud detection result of the user to be detected.

In the embodiments of the present disclosure, the differences in bank statement records between a normal user and an abnormal user are automatically learned by constructing a neural network, the behavior pattern of a user is determined based on the identity information thereof, and the user's personal behavior pattern is rationally represented in a model, so as to improve credit platforms' recognition efficiency and recognition accuracy of fraudulent users, and also greatly save the human cost.

Embodiment V

Figure 9:
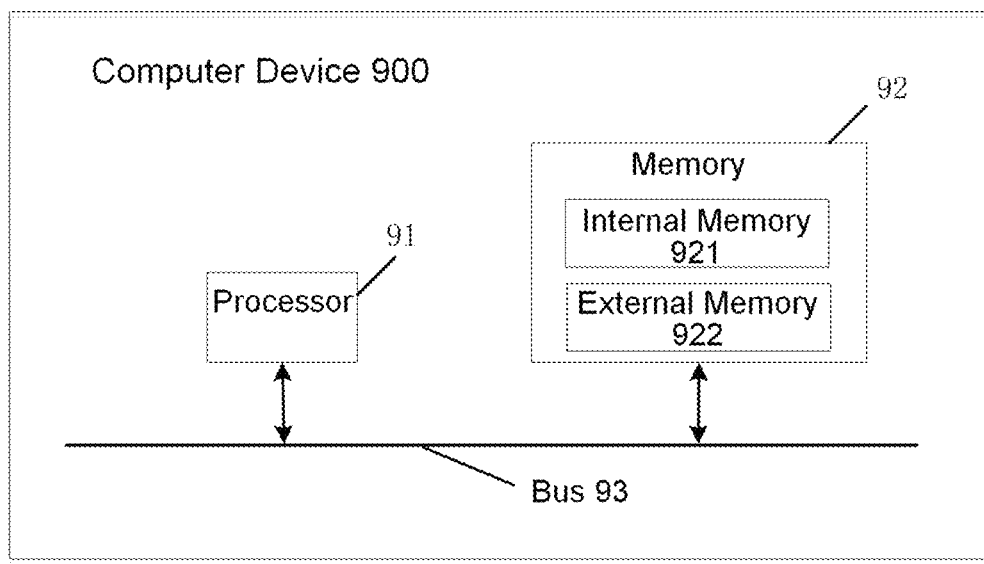
FIG. 9 is a structural schematic diagram of a computer device 900 provided in an embodiment of the present disclosure.

Corresponding to the training method for loan fraud detection model of Embodiment I or the loan fraud detecting method of Embodiment II, an embodiment of the present disclosure further provides a computer device 900. FIG. 9 is a structural schematic diagram of the computer device 900 according to an embodiment of the present disclosure. As shown in FIG. 9, the computer device 900 comprises:

a processor 91, a memory 92 and a bus 93; wherein the memory 92 is configured to store execution instructions and includes an internal memory 921 and an external memory 922; the internal memory 921 herein is also referred to as an internal storage, and is configured to temporarily store arithmetic data in the processor 91 and data for exchange with the external memory 922 such as a hard disk, the processor 91 exchanges data with the external memory 922 via the internal memory 921; when the user device is running, the processor 91 communicates with the memory 92 via the bus 93, such that the processor 91 executes the training method for loan fraud detection model or the loan fraud detecting method provided by the embodiments of the present disclosure in the user mode.

Corresponding to the training method for loan fraud detection model of above Embodiment I or the loan fraud detecting method of above Embodiment II, an embodiment of the present disclosure further provides a computer-readable storage medium on which a computer program is stored, when executed by the processor 91, the computer program executes the steps of the above training method for loan fraud detection model or the loan fraud detecting method described above.

Specifically, the storage medium can be a general-purpose storage medium such as a removable disk, a hard disk, etc., and when executed, the computer program on the storage medium can execute the training method for loan fraud detection model or the loan fraud detecting method described above, so as to solve the problem that pure manual checking will not only lead to a low efficiency, but also make it very difficult to make an overall correct conclusion by integrating bank statement data and user's personal information, and further achieve the effects of improving credit platforms' recognition efficiency and recognition accuracy of fraudulent users, and also greatly saving the human cost.

The computer program products of the training method for loan fraud detection model, the loan fraud detecting method and the apparatus, and the compute device provided in the embodiments of the present disclosure comprise a computer-readable storage medium storing program codes, and the instructions included in the program codes may be configured to execute the methods described in the preceding method embodiments. As to the specific implementation, reference can be made to the method embodiments, and no further description will be made herein.

It could be clearly understood by those skilled in the art that for convenience and brevity of description, as to the specific working processes of the system, apparatus and unit described above, reference can be made to the corresponding processes in the method embodiments described above, and no further description will be made herein.

In the several embodiments provided in the present disclosure, it should be understood that the disclosed system, apparatus and method can be implemented in other ways. The apparatus embodiments described above are merely exemplary, for example, the classification of the units is merely classification according to logical functions, and in actual implementation, the units can be classified in other ways. In another example, multiple units or components may be combined or integrated into another system, or some features may be omitted, or not executed. In addition, the mutual coupling, direct coupling or communication connection illustrated or discussed may be indirect coupling or communication connection via some communication interfaces, apparatuses or units, and may be in electrical, mechanical, or other forms.

When implemented in the form of software functional units and sold or used as independent products, the functions can be stored on a processor-executable and non-volatile computer-readable storage medium. Based on such understanding, the substance of the technical solution of the present disclosure, in other words, the part of the technical solution of the present disclosure that makes contributions to the prior art, or part of the technical solution can be embodied in the form of a software product, and the computer software product is stored on a storage medium, comprising some instructions for enabling one computer device (which can be a personal computer, a server, a network device or the like) to execute all or some of the steps of the methods in various embodiments of the present disclosure. The storage medium includes various mediums capable of storing program codes, such as a USB flash disk, a mobile hard disk, a read-only memory (ROM), a random access memory (RAM), a magnetic disk, or an optical disk.

Finally, it should be noted that the above embodiments are only specific implementation modes of the present disclosure and are used to illustrate the technical solutions of the present disclosure, rather than limit the same, and the scope of protection of the present disclosure is not limited thereto; although the present disclosure has been described in detail with reference to the foregoing embodiments, it should be understood by a person of ordinary skills in the art that within the technical scope disclosed in the present discourse, a person skilled in the art could still modify the technical solutions described in the embodiments, readily conceive variations thereof, or make equivalent substitution to some of the technical features therein; and the modifications, variations or substitutions would not cause the substance of the corresponding technical solutions to depart from the essence and scope of the technical solutions of the embodiments of the present disclosure, and shall all be covered by the scope of protection of the present disclosure. Therefore, the scope of protection of the present disclosure shall be determined by the scope of protection of the appended claims.

INDUSTRIAL APPLICABILITY

By using the technical solutions of the present disclosure, credit platforms' recognition efficiency and recognition accuracy of fraudulent users are improved, and the human cost is also greatly saved.

The invention claimed is:

1. A training method for loan fraud detection model, comprising steps of:
   acquiring identity information and user's bank statement information of a plurality of sample users, and fraud label information corresponding to each user;
   constructing, for each of the sample users, an identity feature vector according to the identity information of the sample user, and non-linearly transforming the identity feature vector using a first vector transformation matrix to obtain a behavior pattern vector of the sample user;
   constructing a statement feature vector of the sample user according to the behavior pattern vector of the sample user, a second vector transformation matrix and the user's bank statement information;
   concatenating the behavior pattern vector with the statement feature vector of the sample user to generate a target feature vector of the sample user, wherein the target feature vector is configured to represent a behavior pattern and an income and expenditure condition of the user;
   feeding a target neural network with the target feature vector of each of the sample users, and acquiring a fraud detection result of the target feature vector of each of the sample users; and
   training the target neural network, the first vector transformation matrix and the second vector transformation matrix according to the fraud detection result of each of the sample users and corresponding fraud label information to obtain the loan fraud detection model,
   wherein the step of constructing an identity feature comprises calculating the product of the identity feature vector and the first vector transformation matrix, and performing non-linear operation on the result of the product of the identity feature vector and the first vector transformation matrix by using a preset non-linear transformation function, to obtain the behavior pattern vector of the sample user.

2. The method according to claim 1, wherein the identity information comprises:
   feature values under a plurality of identity features;
      the step of constructing an identity feature vector according to the identity information of the sample user comprises:
      generating the identity feature vector of the sample user according to the feature values of the sample user under the plurality of identity features.

3. The method according to claim 1, wherein the step of constructing a statement feature vector of the sample user according to the behavior pattern vector of the sample user, a second vector transformation matrix and the user's bank statement information comprises steps of:
   generating, according to at least one preset time length, the second vector transformation matrix and the bank statement information of the sample user, statement data vectors for a plurality of different time periods having the preset time length;
   generating, according to the behavior pattern vector and the statement data vectors of a plurality of different time periods, a weight corresponding to the respective statement data vector of each time period; and
   performing, according to the respective statement data vector of each time period, weighted summation on the statement data vectors of a plurality of different time periods having the preset time length, to obtain a statement feature vector corresponding to the preset time length.

4. The method according to claim 3, wherein the step of generating, according to at least one preset time length, the second vector transformation matrix and the bank statement information of the sample user, statement data vectors for a plurality of different time periods having the preset time length comprises:
   generating, for each of a plurality of different time periods for each preset time length, an original statement data vector of each time period according to the user's bank statement information whose occurrence time falls within the time period; and performing transformation processing on the original statement data vector of the sample user according to the second vector transformation matrix, to generate a respective statement data vector of the time period.

5. The method according to claim 4, wherein the step of performing transformation processing on the original statement data vector of the sample user according to the second vector transformation matrix, to generate a respective statement data vector of the time period comprises steps of:

performing robustness enhancing transformation on the original statement data vector, and/or performing difference elimination transformation on the original statement data vector, to generate a respective transformed statement data vector, and performing statement information transformation on the transformed statement data vector according to the second vector transformation matrix, to obtain the statement data vector of the time period.

6. The method according to claim 5, wherein the robustness enhancing transformation is performed on the original statement data vector as below:

performing the robustness enhancing transformation on the original statement data vector based on a sliding window method, to generate the transformed statement data vector of the time period.

7. The method according to claim 6, wherein the step of performing the robustness enhancing transformation on the original statement data vector based on a sliding window method, to generate transformed statement data vector comprises steps of:

selecting a plurality of elements from the original statement data vector for multiple times according to a window having a preset size, and generating, for each selection, transformed data corresponding to the selection according to the plurality of elements selected this time;

constituting the transformed statement data vector according to the transformed data corresponding to each selection;

wherein the plurality of elements selected the first time comprise a first element in the original statement data vector; the plurality of elements selected the last time comprise a last element in the original statement data vector; and for every two consecutive selections, a preset step length interval is provided between a position of the first element in the former selection and a position of the first element in the latter selection.

8. The method according to claim 7, wherein the robustness enhancing transformation and the difference elimination transformation are performed on the original statement data vector as below:

performing the robustness enhancing transformation on the original statement data vector based on the sliding window method, to generate a respective transformed vector;

calculating, for each non-first element of the transformed vector, an absolute value of the difference between the non-first element and the previous element adjacent to the non-first element, and using a ratio of the absolute value to the non-first element as a difference elimination transformation result of the non-first element; and constituting the transformed statement data vector by using the difference elimination transformation result of the first element in the transformed vector and the difference elimination transformation result of each of the non-first elements in the transformed vector.

9. The method according to claim 6, wherein the robustness enhancing transformation and the difference elimination transformation are performed on the original statement data vector as below:

performing the robustness enhancing transformation on the original statement data vector based on the sliding window method, to generate a respective transformed vector;

calculating, for each non-first element of the transformed vector, an absolute value of the difference between the non-first element and the previous element adjacent to the non-first element, and using a ratio of the absolute value to the non-first element as a difference elimination transformation result of the non-first element; and constituting the transformed statement data vector by using the difference elimination transformation result of the first element in the transformed vector and the difference elimination transformation result of each of the non-first elements in the transformed vector.

10. The method according to claim 5, wherein the difference elimination transformation is performed on the original statement data vector as below:

calculating, for each non-first element of the original statement data vector, an absolute value of the difference between the non-first element and a previous element adjacent to the non-first element, and using a ratio of the absolute value to the non-first element as a difference elimination transformation result of the non-first element; and constituting the transformed statement data vector by using the difference elimination transformation result of the first element in the original statement data vector and the difference elimination transformation result of each of the non-first elements in the original statement data vector.

11. The method according to claim 10, wherein the robustness enhancing transformation and the difference elimination transformation are performed on the original statement data vector as below:

performing the robustness enhancing transformation on the original statement data vector based on the sliding window method, to generate a respective transformed vector;

calculating, for each non-first element of the transformed vector, an absolute value of the difference between the non-first element and the previous element adjacent to the non-first element, and using a ratio of the absolute value to the non-first element as a difference elimination transformation result of the non-first element; and constituting the transformed statement data vector by using the difference elimination transformation result of the first element in the transformed vector and the difference elimination transformation result of each of the non-first elements in the transformed vector.

12. The method according to claim 5, wherein the robustness enhancing transformation and the difference elimination transformation are performed on the original statement data vector as below:

performing the robustness enhancing transformation on the original statement data vector based on the sliding window method, to generate a respective transformed vector;

calculating, for each non-first element of the transformed vector, an absolute value of the difference between the non-first element and the previous element adjacent to the non-first element, and using a ratio of the absolute value to the non-first element as a difference elimination transformation result of the non-first element; and constituting the transformed statement data vector by using the difference elimination transformation result of the first element in the transformed vector and the difference elimination transformation result of each of the non-first elements in the transformed vector.

13. The method according to claim 5, wherein the step of performing statement information transformation on the transformed statement data vector according to the second vector transformation matrix, to obtain data respective statement data vector of the time period comprises:

calculating a product of the transformed statement data vector and the second vector transformation matrix; and taking the result of the product of the transformed statement data vectors and the second vector transformation matrix as the statement data vector.

14. The method according to claim 1, wherein the user's bank statement information comprises: income statement information and expenditure statement information; and the statement feature vector comprises: income statement feature vector, expenditure statement feature vector or statement interaction feature vector;

the step of constructing a statement feature vector of the sample user according to the behavior pattern vector of the sample user, a second vector transformation matrix and the user's bank statement information comprises steps of:

generating the income statement feature vector according to the income statement information, the behavior pattern vector and the second vector transformation matrix;

generating the expenditure statement feature vector according to the expenditure statement information, the behavior pattern vector and the second vector transformation matrix; and generating the statement interaction information according to the income statement information and the expenditure statement information, and generating the statement interaction feature vector according to the statement interaction information, the behavior pattern vector and the second vector transformation matrix.

15. The method according to claim 1, wherein the step of training the target neural network, the first vector transformation matrix and the second vector transformation matrix according to the fraud detection result of each of the sample users and corresponding fraud label information comprises:

taking any one of the sample users whose training is not yet completed in a present round as a target sample user, and determining a cross-entropy loss of the target sample user in the present round according to the fraud detection result and the fraud label information of the target sample user;

adjusting parameters of a target neural network model, the first vector transformation matrix and the second vector transformation matrix according to the cross-entropy loss of the target sample user in the present round;

taking the target sample user as a sample user whose training is already completed, and taking any other one of the sample users whose training is not yet completed in the present round as a new target sample user, acquiring a fraud detection result of the new target sample user using the target neural network model, the first vector transformation matrix and the second vector transformation matrix whose parameters are already adjusted, and returning to the step of determining the cross-entropy loss of the target sample user in the present round according to the fraud detection result and the fraud label information of the target sample user;

completing the present round of training of the target neural network model when the present round of training is finished for all the sample users; and acquiring the loan fraud detection model after several rounds of training of the target neural network model.

16. The method according to claim 15, wherein after completing the present round of training of the target neural network model, the method further comprises steps of:

checking whether a preset number of rounds is reached in the present round, wherein if the preset number of rounds is reached, the training of the target neural network model is stopped, and the target neural network model obtained in the last round of training is used as the loan fraud detection model; or verifying, using a test set, a basic recognition model obtained in the present round, wherein if in the test set, the percentage of test data, whose cross-entropy loss is not greater than a preset threshold for cross-entropy loss, is greater than a first preset percentage threshold, with the percentage based on all the test data in the test set, the training of the target neural network model is stopped, and the target neural network model obtained in the last round of training is used as the loan fraud detection model; or sequentially comparing the cross-entropy loss of each sample user in the present round with the cross-entropy loss of a corresponding sample user in the previous round, wherein if the percentage of the sample users, whose cross-entropy loss in the present round is greater than the cross-entropy loss of the corresponding sample user in the previous round, reaches a second preset percentage threshold, with the percentage based on number of all the sample users, the training of the target neural network model is stopped, and the target neural network model obtained in the previous round of training is used as the loan fraud detection model.

17. A computer device, comprising a memory and a processor, wherein the memory is configured to store a computer program, and the processor implements, when executing the computer program, the training method for loan fraud detection model according to claim 1.

18. A training apparatus for loan fraud detection model, comprising:

a first acquiring module configured to acquire identity information and user's bank statement information of a plurality of sample users, and fraud label information corresponding to each user;

a first constructing module configured to construct, for each of the sample users, an identity feature vector according to the identity information of the sample user, and non-linearly transform the identity feature vector using a first vector transformation matrix to obtain a behavior pattern vector of the sample user, wherein the first constructing module is further configured to:

calculate the product of the identity feature vector and the first vector transformation matrix, and performing non-linear operation on the result of the product of the identity feature vector and the first vector transformation matrix by using a preset non-linear transformation function, to obtain the behavior pattern vector of the sample user;

a second constructing module configured to construct a statement feature vector of the sample user according to the behavior pattern vector of the sample user, a second vector transformation matrix and the user's bank statement information;

a vector concatenating module configured to concatenate the behavior pattern vector with the statement feature vector of the sample user to generate a target feature vector of the sample user, wherein the target feature vector is configured to represent a behavior pattern and an income and expenditure condition of the user; and a training module configured to feed a target neural network with the target feature vector of the sample user and acquire a fraud detection result of the target feature vector of the sample user; and train the target neural network, the first vector transformation matrix and the second vector transformation matrix according to the fraud detection result of the sample user and corresponding fraud label information to obtain the loan fraud detection model.

* * * * *